United States Patent
Baumer (10) Patent No.: US 11,835,178 B2
(45) Date of Patent: Dec. 5, 2023

(54) METHOD FOR PRODUCING A FIBRE-REINFORCED PRESSURE VESSEL WITH POLE CAP REINFORCEMENT

(71) Applicant: NPROXX B.V., Rk Heerlen (NL)

(72) Inventor: Tristan Baumer, Cologne (DE)

(73) Assignee: NPROXX B.V., Rk Heerlen (NL)

( * ) Notice: Subject to any disclaimer, the term of this patent is extended or adjusted under 35 U.S.C. 154(b) by 638 days.

(21) Appl. No.: 17/050,150

(22) PCT Filed: Apr. 24, 2019

(86) PCT No.: PCT/EP2019/060459
§ 371 (c)(1),
(2) Date: Oct. 23, 2020

(87) PCT Pub. No.: WO2019/206959
PCT Pub. Date: Oct. 31, 2019

(65) Prior Publication Data
US 2021/0239269 A1   Aug. 5, 2021

(30) Foreign Application Priority Data

Apr. 26, 2018   (DE) ..................... 10 2018 110 049.3

(51) Int. Cl.
*F17C 1/06*       (2006.01)
*B29C 53/56*   (2006.01)
(Continued)

(52) U.S. Cl.
CPC ................ *F17C 1/06* (2013.01); *B29C 53/56* (2013.01); *B29C 53/80* (2013.01); *B29D 22/003* (2013.01);
(Continued)

(58) Field of Classification Search
CPC ................ F17C 1/06; F17C 2201/0109; F17C 2203/0604; F17C 2203/0619;
(Continued)

(56) References Cited

U.S. PATENT DOCUMENTS

| 2,744,043 A | 5/1956 | Ramberg | |
| 4,288,267 A * | 9/1981 | McLarty | ............... B29C 53/821 |
| | | | 156/425 |
| 5,468,329 A * | 11/1995 | Philpot | ............... B29C 53/8016 |
| | | | 156/169 |

(Continued)

FOREIGN PATENT DOCUMENTS

| CN | 101855488 A | 10/2010 |
| CN | 105443973 A | 3/2016 |

(Continued)

*Primary Examiner* — John L Goff, II
(74) *Attorney, Agent, or Firm* — Tarolli, Sundheim, Covell & Tummino, LLP (57) ABSTRACT

The invention refers to a method of manufacturing a pressure tank, comprising an inner container and an outer layer made of a fiber material which is wound around the inner container. In performing the method, a retention device with several retention elements protruding therefrom is attached to an inner container so as to wind a local pole cap reinforcement in a dome-shaped pole cap portion of the inner container. Then the retention device is removed and an outer layer is produced by winding of fiber material, the outer layer surrounding the central portion and the pole cap portions of the inner container.

10 Claims, 8 Drawing Sheets

(51) Int. Cl.
*B29C 53/80* (2006.01)
*B29D 22/00* (2006.01)

(52) U.S. Cl.
CPC ............ *F17C 2201/0109* (2013.01); *F17C 2201/056* (2013.01); *F17C 2203/0604* (2013.01); *F17C 2203/0619* (2013.01); *F17C 2203/0663* (2013.01); *F17C 2209/2154* (2013.01); *F17C 2209/232* (2013.01); *F17C 2270/0168* (2013.01)

(58) Field of Classification Search
CPC ...... F17C 2203/0663; F17C 2209/2154; F17C 2270/0168; B29C 53/8016; B29C 53/805; B29C 53/602; B29C 53/605; B29C 53/56; B29C 53/80
See application file for complete search history.

(56) References Cited

U.S. PATENT DOCUMENTS

| | | | |
|---|---|---|---|
| 9,879,825 B2 | 1/2018 | Kaneko et al. | |
| 2012/0315569 A1* | 12/2012 | Tanigawa | B29C 70/32 429/515 |
| 2013/0153583 A1 | 6/2013 | Kleschinski | |
| 2016/0339632 A1 | 11/2016 | Kato | |
| 2018/0259125 A1* | 9/2018 | Cousigne | F17C 1/005 |

FOREIGN PATENT DOCUMENTS

| | | | | |
|---|---|---|---|---|
| DE | 102015222391 A1 | * | 5/2017 | ............ F17C 1/06 |
| JP | 2006283968 A | | 10/2006 | |
| JP | 2010236614 A | * | 10/2010 | |
| WO | 2013162428 A1 | | 10/2013 | |
| WO | 2018066293 A1 | | 4/2018 | |

* cited by examiner

METHOD FOR PRODUCING A FIBRE-REINFORCED PRESSURE VESSEL WITH POLE CAP REINFORCEMENT

RELATED APPLICATIONS

The present invention is a U.S. National Stage under 35 USC 371 patent application, claiming priority to Serial No. PCT/EP2019/060459, filed on 24 Apr. 2019; which claims priority of DE 10 2018 110 049.3, filed on 26 Apr. 2018, the entirety of both of which are incorporated herein by reference.

The invention relates to a method of manufacturing a pressure tank, comprising an inner container and an outer layer made of a fiber material, which is wrapped around the inner container.

Within the framework of worldwide efforts to reduce $CO_2$ emissions, an increasing amount of alternative drives is developed for vehicles and put on the market. One trend deals with electromobility, where as an alternative to battery-driven vehicles, fuel cells are provided as well. In the field of vehicle development, efforts are made to convert vehicles of all types to electric driving, where the energy is largely supplied by a fuel cell. The hydrogen necessary for this purpose is stored in high-pressure tanks. In order to minimize the weight of these mobile applications, preferably pressure tanks of type 4 are used, in particular fiber-reinforced plastic liners, a CFK reinforcement being preferably employed.

These containers consist of a cylindrical center part, both sides of which border to a bulged pole cap closing the tank. One manufacturing method of these pressure tanks is the filament winding method, where high performance fibers are wound around a plastic liner having the inner contour of the tank. A matrix system which is applied either before the filament winding or in situ on the fibers provides for cross-linking in order to ensure stability of the fiber reinforcement.

Dimensioning of the fiber reinforcement can roughly be subdivided into two parts, namely reinforcement of the cylindrical part of the pressure tank and reinforcement of the bulged pole caps. Naturally, these components cannot be separated because the forces apply on both areas and because both parts have a transition area. However, the person skilled in the art knows that fiber reinforcement for the cylindrical portion of a pressure tank is relatively easy to calculate (boiler formula). The pole cap portion is much harder to dimension due to its three-dimensional contour.

Determining the necessary fiber reinforcement in the pole cap portion is particularly difficult because the pole cap cannot be reinforced radially. A fiber wound in the radial direction would slide down the bulged pole cap and onto the bottleneck, not leading to reinforcement. Normally, therefore, pole cap reinforcement is achieved by winding fibers around the entire tank at specific fiber angles in order to sufficiently reinforce the pole cap portion. These fibers extend over the entire cylindrical portion of the pressure tank down to the opposite pole cap so as to reinforce the latter in the same way. These fiber layers, however, are to a large extent not required in the cylindrical portion. This method leads to an increased consumption of fibers which, however, are only used in the pole cap portion.

Since fiber consumption and the corresponding manufacturing costs are very high, especially in long tanks, it is desirable to reduce this consumption. This is possible, for instance, if pole cap reinforcement and the fibers necessary for it are applied only in the pole cap portion of a liner.

In the state of the art, methods are known which allow targeted pole cap reinforcement. For example, a pole cap area can be reinforced by a fiber placement method before the actual winding is performed. During this process, pre-impregnated slivers (prepregs) are positioned on the pole caps by the positioning head of a robot. A disadvantage of this method, however, is that it is a separate, upstream production method where pre-impregnated slivers must be used. Also, the matrix materials employed in the fiber placement method and the subsequent winding method are different and must be able to combine.

In addition, there are other upstream production methods by means of which the pole caps can be reinforced. Frequently, structures are provided on a liner which help to retain fibers and prevent them from sliding. By suitably forming and arranging such retaining structures, the fibers can be wound around the pole caps before the cylindrical portion of a pressure tank. For instance, JP 2010-236614 A discloses a method of manufacturing a pressure tank made of composite material, where retaining structures in the form of circumferential grooves or individual knobs are provided on the pole caps. These retaining structures help to wind the fibers first around the pole caps and then around the cylindrical portion of the liner. The method is finished by applying a winding layer which covers both the pole caps and the cylindrical portion.

Such procedures using retaining structures on a liner are widely known in the state of the art. For example, WO 2013/162428 A1 discloses a pressure tank made of composite material where circumferential series of protruding pins surrounding a liner are provided so as to prevent fibers to be wound around the liner from sliding. The pins remain in the resulting layer of fibers and are either covered by it, or they protrude from the fiber layer. To provide such solutions, however, specific liners having a plurality of protruding pins must be produced which requires additional manufacturing steps, resulting in additional handling processes, longer manufacturing times and higher investment costs. This makes it increasingly difficult to exploit the savings potential provided by a reduction of the amount of fibers.

Winding devices using retention arms, which are designed to prevent fibers from sliding during the winding process, are known as well, one example of which is disclosed in JP 2010-167582. Such particular winding devices increase the necessary production effort as well.

It is therefore an object of the invention to provide a method of manufacturing a fiber-reinforced composite material pressure tank by means of which the amount of necessary reinforcement fibers can be reduced without increased manufacturing effort.

It is pointed out that the features listed individually in the Claims can be combined in any technically useful manner and indicate further developments of the invention. The specification additionally characterizes and specifies the invention, in particular in combination with the Figures.

With the method according to the invention, a pressure tank can be produced which comprises an inner container and an outer layer made of a fiber material, which is wound around the inner container. Well-known materials can be used for the inner container and the outer layer consisting of a fiber material. The inner container preferably is a plastic liner made of a thermoplast, which can in particular be produced by extrusion blowing. As fiber material for reinforcing the inner container, for instance a carbon, aramid, or glass fiber with a suitable resin matrix can be used.

The inventive method of manufacturing such a pressure tank comprises at least the following steps:

a) providing an inner container with a cylindrical central portion which has two opposite end portions whose openings are each closed by a dome-shaped pole cap portion;

b) attaching a retention device with several protruding retention elements in the area of an end portion of the central portion of the inner container, the retention device being attached axially spaced from the opening of the end portion;

c) producing a pole cap reinforcement by winding fiber material around at least part of the pole cap portion and the end portion with the retention device, the fiber material being guided around the protruding retention elements of the retention device with a reversal of direction;

d) winding a circumferential winding around the end portion with pole cap reinforcement, the circumferential winding being located between the opening of the end portion and the retention device;

e) cutting the fiber material of the pole cap reinforcement between the retention device and the circumferential winding;

f) removing the retention device;

g) producing an outer layer by winding of fiber material, the outer layer enclosing the central portion and the pole cap portions of the inner container.

For performing a method according to the invention, accordingly a separate retention device with several protruding retention elements is used for producing a pole cap reinforcement by means of a winding method before the actual outer layer is produced with a winding method as well. The retention device allows depositing of the reinforcement fibers on a pole cap portion and reversing them in the end portion of the pressure tank cylinder so as to make it possible to deposit the next layer of fibers. The method thus allows a deposition of reinforcement fibers with the required fiber angles only in the pole cap portion.

The resulting pole cap reinforcement then extends over at least part of the pole cap portion and part of the pressure tank cylinder. This pole cap reinforcement is fixed into place on the respective end portion of the pressure tank cylinder by means of circumferential winding so that the reinforcement fibers between this circumferential winding and the retention device can be cut. In this way, the retention device can be removed and used for additional pole cap reinforcements. Thus, the retention device does not remain on the inner container and is not integrated into an outer layer, either. Instead, it can be reused over and over again for a new pole cap reinforcement.

In this manner, a pole cap reinforcement is created in at least one pole cap portion, preferably in both pole cap portions, of a plastic liner. Subsequently, an outer layer can be wound in a conventional manner around the pole cap reinforcements and the other portion of the inner container that is to be reinforced with fibers. However, fiber windings are no longer necessary for reinforcing the pole caps before the transition area to the cylindrical central portion so that the consumption of fibers is substantially reduced with respect to conventional fibers. Savings of up to 20% of the fibers are possible.

The retention device is preferably annular and completely encloses the central portion of the inner container in an end portion. It thus forms a type of ring which surrounds the inner container and is fixed to it. In particular, the retention device is composed of at least two portions which are interconnected to form a ring. This connection is preferably formed by a screw-type fitting, but other detachable connection are possible as well. The portions are connected to each other in such a way that they can be pressed onto the inner container so that the retention device is not displaced during winding. By releasing the screw-type fitting, the portions can be separated from each other after a pole cap reinforcement has been produced, and can be removed from the inner container.

The retention elements are formed by several pins protruding from the retention device at an angle of 30-80°, in particular an angle of 45-70°, to the pressure tank axis. In each case, the pins point to the opposite pole cap. The pins preferably taper at their ends. The pitch of the pins amounts, for instance, to approximately 4 mm±2 mm. After assembly of the ring halves, a closed ring with outwardly protruding pins results. Such an annular retention device with a plurality of protruding pins will also be called pin corona in the following.

The pole cap reinforcement is produced in such a way that in the necessary areas, reinforcement fibers are deposited at a specific angle. The fibers can be wound over the entire pole cap portion. On the other hand, the crest of a pole cap can also be reinforced by windings over the entire inner container from one pole cap to the other. In a preferred embodiment of the invention, the crest is therefore not provided with a separate pole cap reinforcement but remains free. The pole cap reinforcement then surrounds only the critical portion of a pole cap before the transition to the cylindrical central portion.

If retention devices are attached to both pole caps, their protruding pins each point to the opposite retention device. The pole cap reinforcements can be produced in succession or simultaneously. If a winding device only provides for one fiber guide, it will first be applied on a first pole cap and then on the second pole cap. For this purpose, the fiber guide and/or the inner container can be translated with respect to each other.

It is particularly advantageous, however, if both pole cap reinforcements are produced simultaneously. This helps to accelerate the production process, and additional handling steps can be avoided. Step c) of the method according to the invention will then be performed simultaneously in both pole cap portions by a winding device with at least two fiber guides. A first fiber guide deposits fiber material for a pole cap reinforcement in a first pole cap portion, and a second fiber guide deposits fiber material for a pole cap reinforcement in an opposite, second pole cap portion. The rotation of the inner container and the relative movements between the inner container and the respective fiber guide will then be coordinated accordingly. Preferably, both fiber guides are arranged on opposite sides of the inner container.

By using such a winding device with at least two fiber guides, it is also possible to produce the outer layer which is then deposited on the two pole cap reinforcements and the rest of the inner container. The advantage is that with the same winding machine, the pole cap reinforcements and also the outer layer can be wound as quickly and effectively as possible.

The pole cap reinforcements and the outer layer can be made of the same fiber matrix system so that no different materials have to be matched up. Thus, the method of targeted pole cap reinforcement according to the invention precisely addresses a weak point of conventional methods. The pole cap reinforcement is produced with the filament winding method, with same material and with the methods with which the entire pressure tank is reinforced.

Other advantages, particularities and advantageous further developments of the invention result from the dependent Claims and from the following presentation of preferred examples of embodiment by means of the Figures.

Figure 1:
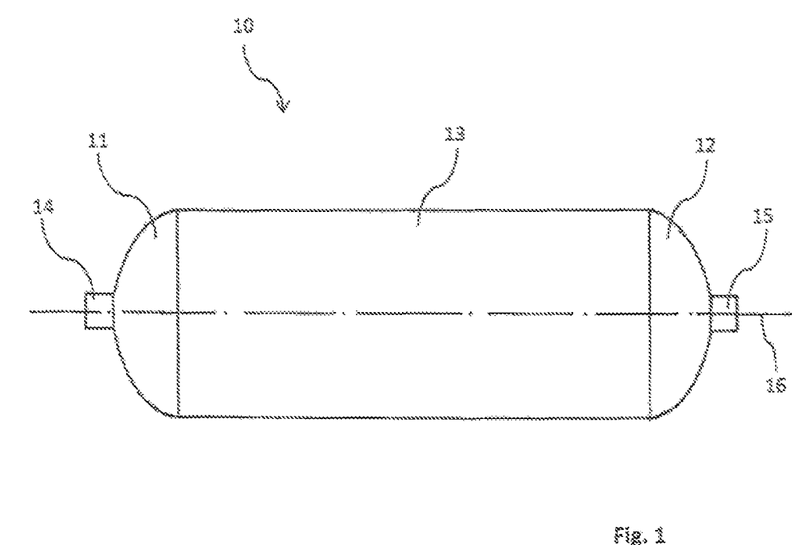
FIG. 1 shows a pressure tank.

A pressure tank or composite-material pressure tank, respectively, to be produced with the method according to the invention is shown in FIG. 1. The pressure tank 10 has a cylindrical central portion 13 and two bulged pole caps 11 and 12 which close the openings of the cylindrical central portion 13. Protruding connecting flanges 14 and 15 can be provided on these pole caps 11, 12, shape and arrangement of these flanges 14, 15 only being indicated by way of example. The cylindrical central portion 13 has end portions which border on the bulged pole caps 11, 12.

Figure 2:
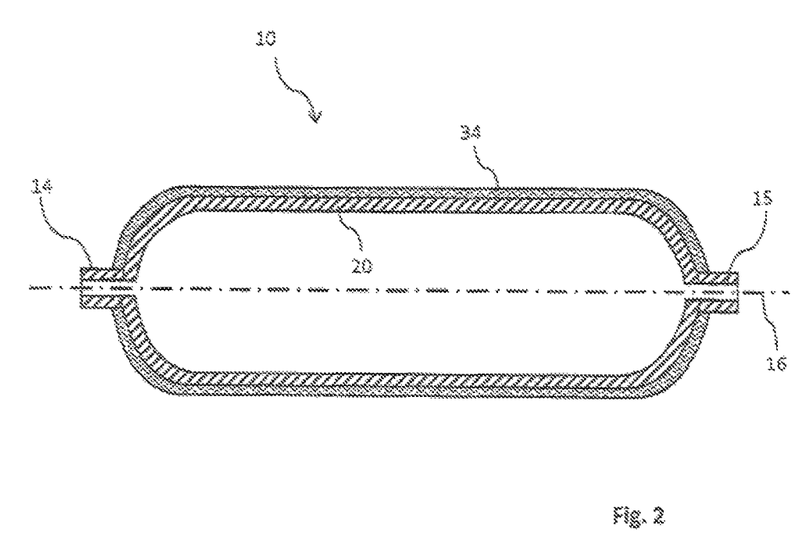
FIG. 2 shows a longitudinal section through a pressure tank according to FIG. 1.
Figure 3A:
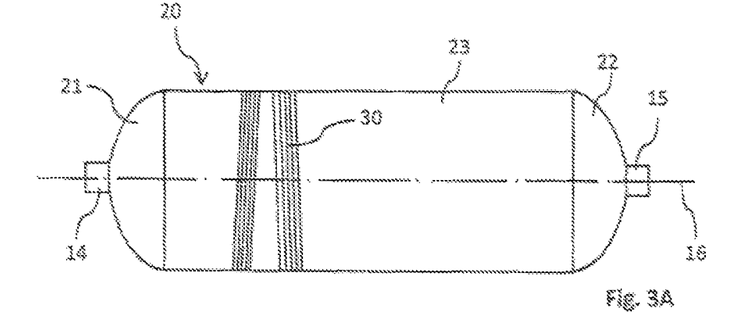
FIGS. 3A-3D show fiber windings at different angles.
Figure 3B:
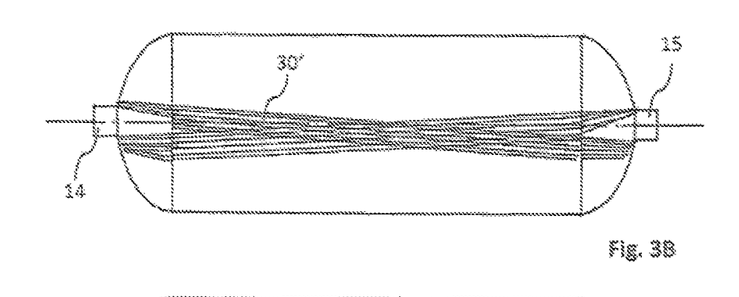
Figure 3C:
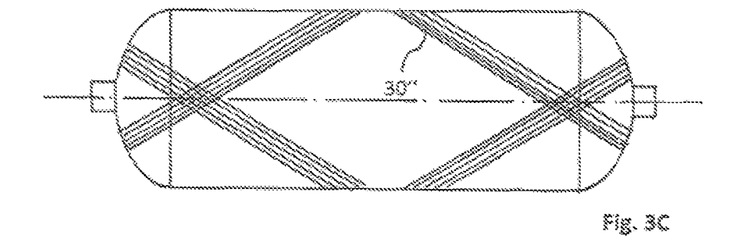
Figure 3D:
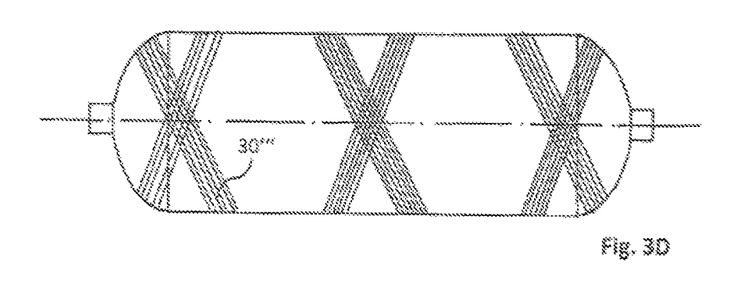

A pressure tank 10 of this kind is produced by reinforcing an inner container with an outer layer made of fiber reinforcement. FIG. 2 shows this structure of the pressure tank 10 in a schematic longitudinal section. An outer layer 34 made of reinforcement fibers is wound around an inner container 20. The shape of the inner container 20 substantially corresponds to the shape of the pressure tank 10 to be produced so that the inner container 20 has a cylindrical central portion 23 and two bulged pole cap portions 21 and 22 which close the openings of the cylindrical central portion 23. The inner container 20 is preferably formed by a plastic liner the shape of which has been formed, for instance, with an extrusion blowing method. FIG. 3A shows such an inner container 20 with the abovementioned portions. Reinforcement fibers can be wound around the inner container 20 at various angles and with various courses. FIG. 3A, for instance, shows a circumferential winding 30 in the area of the central portion 23. FIG. 3B shows a winding 30' which extends longitudinally over the entire inner container 20 and next to the connecting flanges 14 and 15. FIGS. 3C and 3D show the windings 30" and 30'" which are deposited around the cylindrical central portion 23 and the pole cap portions 21, 22 at a larger angle. Especially the winding 30'" near the transition from a pole cap portion 21, 22 to the cylindrical central portion 23 requires large amounts of fiber material which can be saved with the method according to the invention.

Figure 4A:
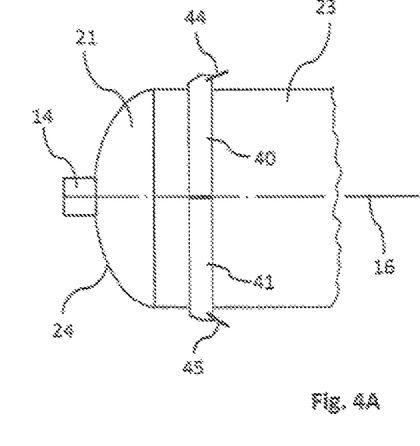
FIG. 4A shows a lateral view of a pole cap portion with pin corona.
Figure 4B:
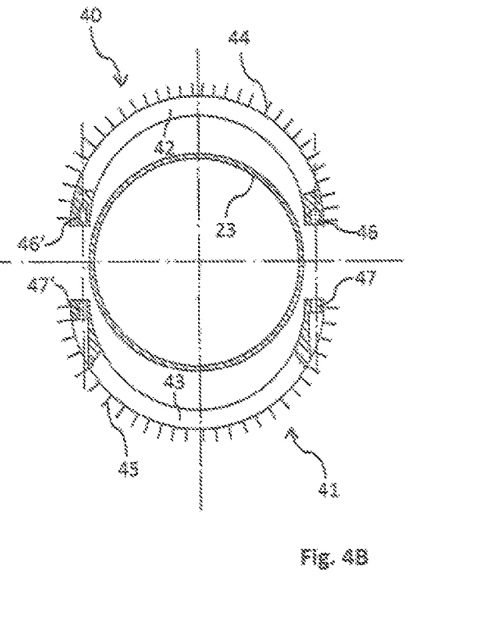
FIG. 4B shows a schematic section through a pole cap portion with pin corona.

The method according to the invention provides for a retention device with several protruding retention elements to be attached in at least one end portion of the central portion 23 of the inner container 20 for winding a targeted pole cap reinforcement. Preferably, a pole cap reinforcement is produced on both pole caps in this manner. FIG. 4A shows the left side of an inner container with a retention device attached in its cylindrical central portion 23. The retention device is formed by two pin coronal halves 40 and 41 which are interconnected to form a ring. FIG. 4B shows the two pin corona halves 40, 41 in released state. The pin corona formed in this manner is attached to the cylindrical central portion 23 at a space from the pole cap portion 21 and, for instance, at a distance of approximately 30 mm from the end of the cylindrical central portion 23.

The pin corona consists of two 180° ring halves 42 and 43 which can be fitted together precisely by means of a joint. The connecting pieces 46, 47 may form, for instance, a first screw-type connection, whereas the connecting pieces 46', 47' form a second screw-type connection. The inner diameter of the assembled pin corona is the same as the outer diameter of the inner container 2, but is press-fitted on the inner container, for instance by tightening of the screw-type connections. In any case, the assembled pin corona should be fitted tightly over the pressure tank and may not be displaced if subjected to a load by the occurring fiber tensions.

Both ring halves 42, 43 of the pin corona are provided with several sharp pins 44, 45 protruding from the pressure tank axis 16 at an angle of 45-70°. The pitch of the pins is approximately 4 mm±2 mm. After assembly of the pin corona halves 40, 41, a closed ring with outwardly protruding pins results each of which points to the opposite pole cap.

Figure 5:
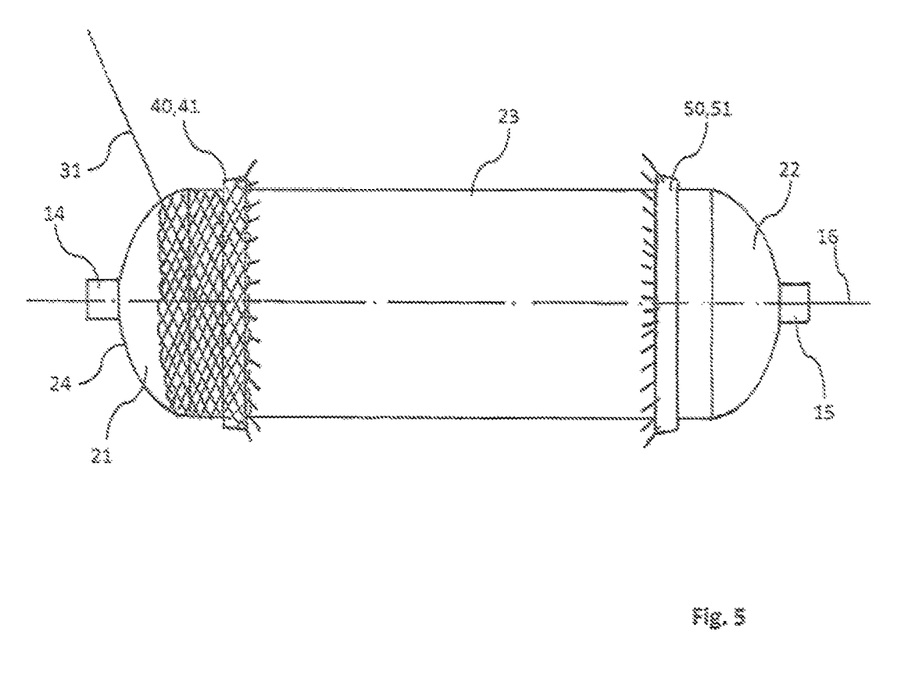
FIG. 5 shows the production of a winding for a pole cap reinforcement.

FIG. 5 shows the production of a pole cap reinforcement in which the fiber material 31 is applied for a reinforcement. This attachment of windings to the pole caps starts with the fastening of the reinforcement fibers 31 to the inner container 20 or to the pin corona 40, 41. The fibers are wound on the pole cap portion 21 by rotation of the liner and deposition of the reinforcement fibers 31 on the pole cap portion 21 at the predefined fiber angle, performed under numerical control (NC). Reversal in the pole cap portion 21 takes place by depositing the fibers on the geodetic path. After the fibers have passed the pin corona 40, 41 on their path to the opposite pole cap, axial depositing of the reinforcement fibers is interrupted and the fibers are reversed by rotation of the inner container at the pins 44, 45 of the pin corona 40, 41. Due to the inclined position of the pins 44, 45, the fibers slide down to the lowest point of the pin in the direction of the inner container. This guarantees an even fiber deposition without discontinuities. Rotation of the inner container takes place until the reinforcement fibers have been securely fixed and the next dividing point of the winding has been reached. The fibers should always be guided around one or more pins in order to achieve fixation of the fibers. Preferably, the winding should be performed in such a way that the smallest possible amount of pins is covered by windings since otherwise too much fiber material would accumulate behind the pins.

The reinforcement fibers 31 are then again guided in the direction of the pole cap portion to be reinforced and the next pole cap covering is wound. This process is repeated until the required pole cap portion is covered. At the end of the reinforcement winding, the thread eye is positioned behind the pin corona on the opposite side of the pole cap portion. If a second pole cap reinforcement is to be performed with the same or with a different fiber angle, this can be done directly. During this process, a crest 24 of the pole cap portion 21 can be left out as shown in the embodiment in FIG. 5. This crest 24 can be covered with winding by an axial reinforcement in an outer layer 34 of fiber material to be applied later, as indicated, for instance, in FIG. 3D by reference number 30'. Preferably, such an axial reinforcement 30' is provided anyway, reinforces the crest 24 and retains the connecting flanges 14, 15.

Figure 6:
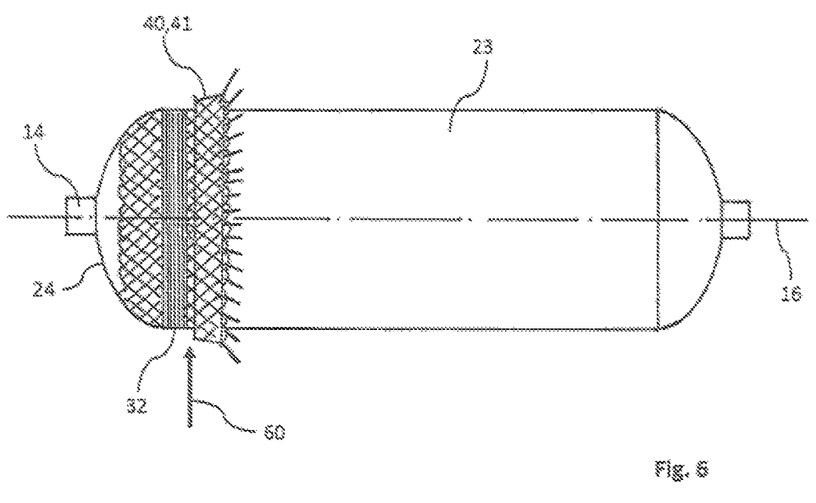
FIG. 6 shows a pole cap reinforcement before removal of the pin corona.

If local pole cap reinforcement is completed, a fixation is applied using the reinforcement fibers by radially winding the reinforcement fibers onto the cylindrical step of the inner container between the pole cap and the pin corona. This results in the circumferential winding 32 shown in FIG. 6. To achieve this, the thread eye leads the reinforcement fibers to the other side of the pin corona 40, 41 and directs them onto a fiber support in the circumferential direction, precisely on the cylindrical step between pole cap and pin corona. After this fixation layer has been completed, the fibers of the pole cap reinforcement are cut or directed and fixed on the cylindrical part of the inner container, centrally between the pole caps.

The winding machine is then stopped. The fibers of the pole cap reinforcement can now be cut between the pin corona 40, 41 and the pole cap portion 21 without damaging the inner container. This is shown by an arrow 60 in FIG. 6. Cutting either takes place on a metal support which has been positioned before assembly of the pin corona 40, 41 and is later removed together with the corona, or a cutting knife is used which cuts the fibers outwardly.

Figure 7:
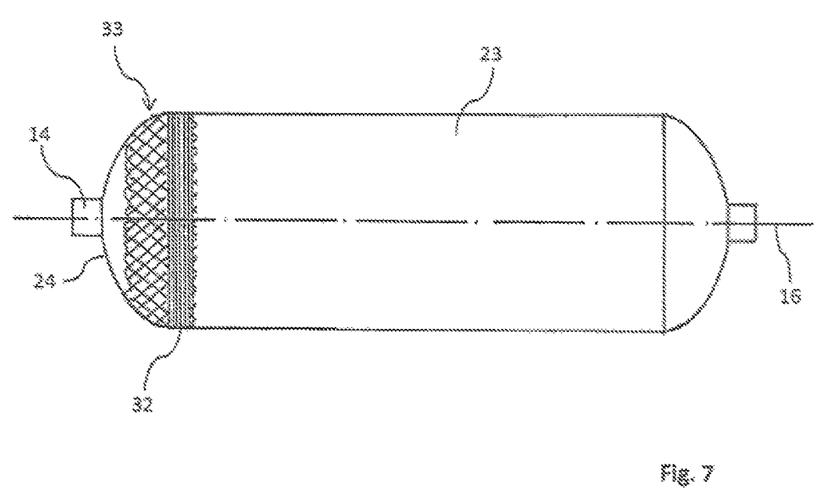
FIG. 7 shows a pole cap reinforcement after removal of the pin corona.
Figure 8:
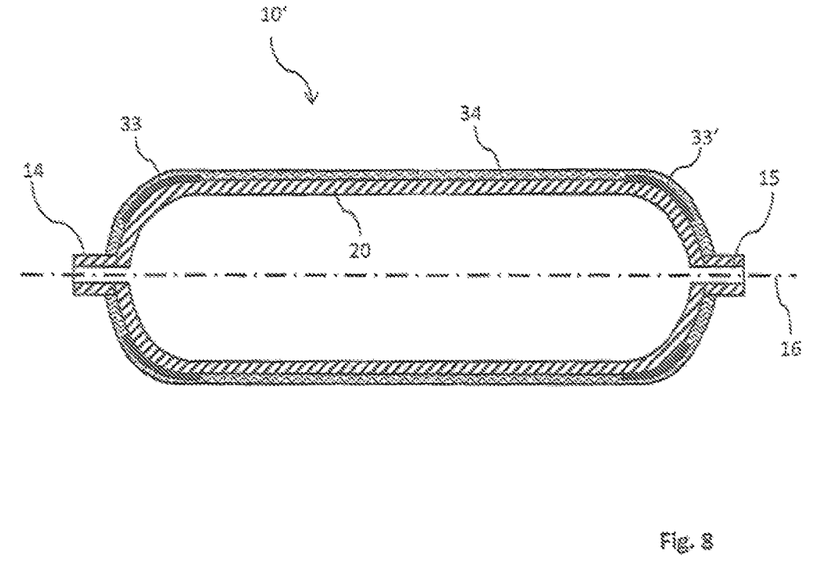
FIG. 8 shows a longitudinal section of a pressure tank with pole cap reinforcement and outer layer.

After the pole cap reinforcement fibers have been cut, the pin corona is opened and removed from the inner container. This phase is shown in FIG. 7. Reinforcement of the opposite pole cap takes place in the same way as reinforcement of the first pole cap. After the pole cap reinforcements have been completed, the rest of the pressure tank winding is performed. Preferably, first the cylindrical portion 23 of the inner container is provided with circumferential layers until an evenly smooth surface in the cylindrical portion of the container with the pole cap reinforcements has been produced so that the subsequent axial windings have a well-defined support. FIG. 8 shows a schematic longitudinal section through a pressure tank 10' produced in this manner which has two pole cap reinforcements 33 and 33' on the inner container 20 which are surrounded by an outer layer 34 made of reinforcement fibers.

For producing the fiber windings for the pole cap reinforcements and the outer layer, suitable winding machines can be used, with different functional principles being applied. This type of machines originates from restructured lathes; therefore, older winding machines are frequently similar to simple lathes, with the fiber guide being mounted on the longitudinal slide. This construction is used with very simple winding components or components with extreme lengths or diameters since a bed structure is easy to implement.

If larger numbers of parts are produced, often portal machines having several spindles are employed. The advantage is that these machines are easy to access, open towards the bottom and easy to clean. In a portal winding machine, a slide slides on a carrier in parallel to the axis of the winding body and guides the fibers onto the winding core by means of numerical control. Generally, several axes are integrated in such a slide system: the Y axis parallel to the winding axis, the Z axis which performs the feeding movement to the winding axis and a rotational axis which ensures that the band consisting of individual fibers can be fed normally to the surface of the winding core. Since the reinforcement fibers are generally fed to the winding machine from the space behind the machine, in most machines the thread eye is positioned centrally at the height of the winding axis. If importance is attached to a fiber deposition which is well visible, the fibers are guided onto the winding core from above. Thus, the point of deposition of the reinforcement fibers on the winding core is not covered by the core.

If according to the invention two local pole cap reinforcements are to be wound onto the end portions of an inner container, one possibility to do this is with the well-known sequential winding technology. Alternatively, a winding machine can be structured such that a second slide whose translation axes are identical to those of a first slide is provided on the opposite side of the inner container. This slide can operate in parallel to the first slide and perform the second pole cap reinforcement simultaneously. This second slide can either be attached to the same longitudinal axis guide as the first slide or separately on a different guiding system. If both slide systems are mounted on a common longitudinal axis guide, collisions may occur, especially if the programming is faulty or if the local reinforcements are too close together and the movements of the fiber guides interfere with each other. Preferably, therefore, a second longitudinal guiding system for a second independent fiber guide slide system is mounted on the opposite side of the winding axis. In this way, both slide systems are opposite each other with respect to the winding axis and are completely independent.

Figure 9:
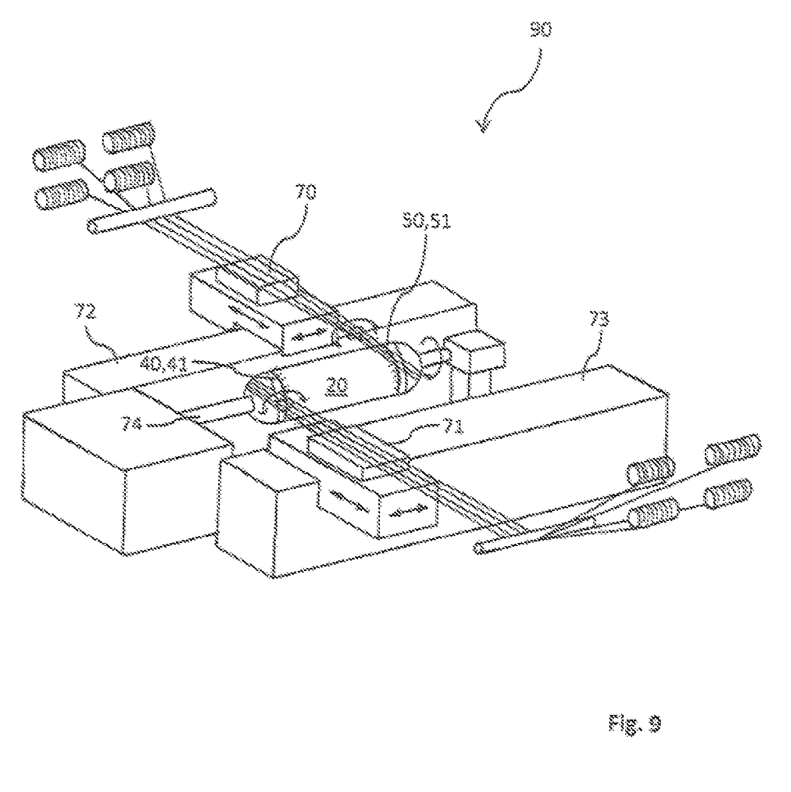
FIG. 9 shows a first embodiment of a winding device during the winding of two pole cap reinforcements.

FIG. 9 shows a schematic representation of a possible embodiment of such a winding machine 90 with a bed structure and two opposite fiber guide slide systems 70 and 71. These two fiber guides 70, 71 are each attached to a longitudinal axis guide 72, 73 in parallel to the winding axis 74. In this manner, retaining devices can be mounted on both pole cap portions of a liner 20. FIG. 9 schematically shows a left pin corona with two pin corona halves 40, 41 and a right pin corona with two pin corona halves 50, 51. With these pin coronas, two pole cap reinforcements are wound simultaneously. The adjacent outer layer can also be wound at the same time by means of the two fiber guides 70, 71.

Figure 10:
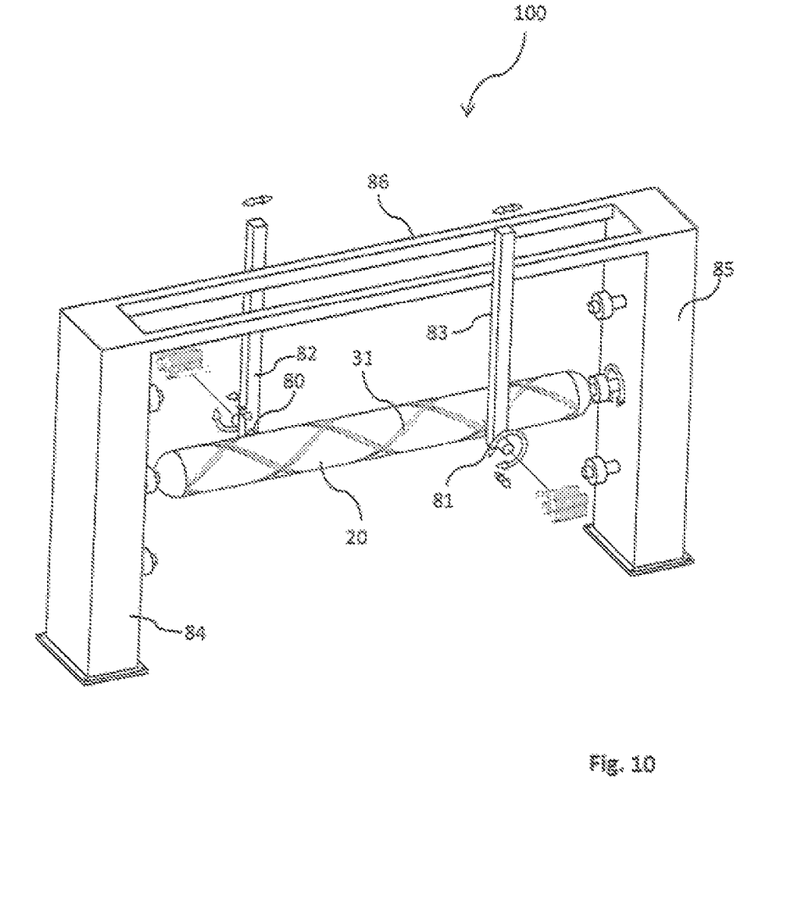
FIG. 10 shows a second embodiment of a winding device during the winding of an outer layer.

FIG. 10 shows the winding process for an inner container 20 in an alternative winding machine embodied as a portal winding machine 100 with two separate, suspended fiber guide slide systems. The portal of the machine is substantially formed by two lateral posts 84 and 85 connected by an upper cross member 86. On this cross member 86, two retention arms 82 and 83 can be translated each of which has a fiber guide 80 and 81 at its lower end by means of which fiber material 31 can be deposited on an inner container 20. Retention arm and fiber guide each form one fiber guide slide system. If the two slide systems are brought to their end positions, full accessibility of the winding axis is ensured.

By means of this winding machine 100, reinforcements such as local pole cap reinforcements of pressure tanks can be wound as well; but this construction also allows parallel winding by both fiber guide systems over the entire winding body. For this purpose, the second fiber guide system 83, 81 performs synchronous movements which are partially opposite to those of the first slide system 82, 80. In this way, the winding of the winding body is divided; 50% are performed by the slide system 82, 80 and 50% by the slide system 83, 81. In this way, the winding time for the complete winding process is cut in half.

LIST OF REFERENCE NUMBERS

10, 10' pressure tank
11, 12 pole cap
13 central portion
14, 15 connecting flange
16 pressure tank axis 20 inner container, liner
21, 22 pole cap portion
23 central portion
24 crest
30,30',30",30''' fiber winding
31 fiber material
32 circumferential winding, fixation winding
33, 33' pole cap reinforcement
34 outer layer
40, 41 pin corona half
42, 43 ring half
44, 45 retention element, pin
46,46',47,47' connecting piece
50, 51 pin corona half
60 cutting line
70, 72 fiber guide, fiber guide slide system
72, 73 longitudinal axis guide
74 winding axis
80, 81 fiber guide, fiber guide slide system
82, 83 retention arm
84, 85 lateral post
86 cross member
90, 100 winding machine

The invention claimed is:

1. Method of manufacturing a pressure tank, comprising an inner container and an outer layer made of a fiber material, which is wound around the inner container; characterized by the following steps:
   a) providing an inner container with a cylindrical central portion, having two opposite end portions the openings of which are each closed by a dome-shaped pole cap portion;
   b) attaching a retention device with several protruding retention elements in the area of an end portion of the central portion, the retention device being axially spaced from the opening of the end portion;
   c) manufacturing a pole cap reinforcement by winding fiber material around at least part of the pole cap portion and the end portion with the retention device, the fiber material being guided around the protruding retention elements of the retention device with reversal of direction;
   d) winding a circumferential winding around the end portion with the pole cap reinforcement, the circumferential winding being positioned between the opening of the end portion and the retention device;
   e) cutting the fiber material of the pole cap reinforcement between the retention device and the circumferential winding;
   f) removing the retention device;
   g) manufacturing an outer layer by winding fiber material, the outer layer enclosing the central portion and the pole cap portions of the inner container.

2. Method according to claim 1,
characterized in that the retention device is annular and completely encloses the central portion at an end portion.

3. Method according to claim 2,
characterized in that the retention device consists of at least two portions which are interconnected to form a ring.

4. Method according to claim 1,
characterized in that the retention elements are formed by several pins which protrude from the retention device at an angle of 30-80° from the pressure tank axis.

5. Method according to claim 1,
characterized in that during the winding of a pole cap reinforcement in step c) a crest of a pole cap portion remains free from fiber material.

6. Method according to claim 1,
characterized in that the steps b) through f) are performed on both end portions of the central portion of the inner container.

7. Method according to claim 6,
characterized in that step c) is performed in both pole cap portions sequentially or simultaneously.

8. Method according to claim 7,
characterized in that step c) is performed in both pole cap portions simultaneously by means of a winding device with at least two fiber guides; with a first fiber guide depositing fiber material for a pole cap reinforcement in a first pole cap portion and a second fiber guide depositing fiber material for a pole cap reinforcement in an opposite, second pole cap portion.

9. Method according to claim 8,
characterized in that in step g), the outer layer is also produced by simultaneous depositing of fiber material over the at least two fiber guides.

10. Method according to claim 1,
characterized in that the fiber material of the pole cap reinforcement corresponds to the fiber material of the outer layer.

\* \* \* \* \*